USO05912770A

United States Patent [19]

Tsuchida

[11] Patent Number: 5,912,770
[45] Date of Patent: Jun. 15, 1999

[54] ACHROMATIC LENS SYSTEM

[75] Inventor: Hirofumi Tsuchida, Kunitachi, Japan

[73] Assignee: Olympus Optical Co., Ltd., Tokyo, Japan

[21] Appl. No.: 08/970,767

[22] Filed: Nov. 14, 1997

[30] Foreign Application Priority Data

Nov. 15, 1996 [JP] Japan .................................. 8-318582

[51] Int. Cl.$^6$ .................................................. G02B 3/00
[52] U.S. Cl. ............................................ 359/654; 359/652
[58] Field of Search ................................ 359/652–654

[56] References Cited

U.S. PATENT DOCUMENTS

| | | | |
|---|---|---|---|
| 4,934,798 | 6/1990 | Bunch | 359/652 |
| 5,235,464 | 8/1993 | Tsuchida | 359/652 |
| 5,412,506 | 5/1995 | Feldblum et al. | 359/652 |

FOREIGN PATENT DOCUMENTS

| 393 | of 1988 | Japan . |
|---|---|---|
| 4-181908 | 6/1992 | Japan . |

OTHER PUBLICATIONS

Applied Optics/ vol. 27, No. 4/ Jul. 15, 1988 Hybrid Diffractive–Refractive Lenses and Achromats, Thomas Stone et al. pp. 2960–2971.

*Primary Examiner*—Georgia Epps
*Assistant Examiner*—Evelyn A. Lester
*Attorney, Agent, or Firm*—Pillsbury Madison & Sutro LLP

[57] ABSTRACT

An achromatic lens system which comprises a radial type gradient index lens which has a refractive index varying in a direction perpendicular to an optical axis and a diffraction type lens, and sufficiently corrects the secondary spectrum with a small number of optical elements.

8 Claims, 3 Drawing Sheets

ACHROMATIC LENS SYSTEM

BACKGROUND OF THE INVENTION

A) Field of the Invention:

The present invention relates to an achromatic lens system which is to be used in optical systems for telescopes, microscopes, cameras, video cameras, etc., and an image pickup lens system which comprises an achromatic lens system.

B) Description of the Prior Art

An optical system which is to be used in telescopes, microscopes, cameras, video cameras, etc. generally has a composition in which a large numbers of lenses are combined for enhancing optical performance of the optical system. A cemented achromatic lens which is referred to as an achromat is frequently used in optical system for correcting chromatic aberration in particular. This achromat corrects chromatic aberration ordinarily for rays having two wavelengths such as the C-line and the F-line, but does not strictly correct chromatic aberration for rays having different wavelengths such as the g-line, thereby allowing chromatic aberration which is referred to as the so-called secondary spectrum to remain. This residual chromatic aberration often poses problems in objective lens systems for telescopes and microscopes as well as telephoto lens systems for cameras and so on in particular, and a lens system which is made achromatic for three wavelengths and is referred to as an apochromat is used for correcting the residual chromatic aberration.

However, it is necessary for manufacturing apochromats to use fluorite or low dispersion glass materials which have extraordinary dispersion characteristics, and are expensive and hard to work, thereby enhancing manufacturing costs of optical systems.

In addition to ordinary lenses which utilize the refraction phenomenon, there are available lenses which utilize the diffraction phenomenon and are referred to as diffraction type lenses. The diffraction type lens has a dispersion characteristic which is different from that of the ordinary lens. As an example wherein a diffraction type lens is used for correcting the secondary spectrum of chromatic aberration, there is an optical system which consists of a combination of a cemented lens and a diffraction type lens as described in Applied Optics, Vol. 27, pp 2960 through 2971.

Furthermore, as another example of lens system wherein chromatic aberration is corrected using a diffraction type lens, there is known a lens system such as that disclosed by Japanese Patent Kokai Publication No. Hei 4-181908 which uses a combination of a diffraction type lens and a radial type GRIN lens.

An optical system such as that described in the literature mentioned above (Applied Optics) which consists of a combination of a cemented lens and a diffraction type lens uses three optical elements in total or a large number of optical elements, thereby requiring a high manufacturing cost. Moreover, the lens system disclosed by the published bulletin mentioned above which consists of the radial type GRIN lens and the diffraction type lens is designed while paying attention only to chromatic aberration of the first order and no description is made of the secondary spectrum in the bulletin.

SUMMARY OF THE INVENTION

A primary object of the present invention is to provide an achromatic lens system which elaborately corrects the secondary spectrum of chromatic aberration with a small number of optical elements.

The achromatic lens system according to the present invention comprises a radial type gradient index lens (radial type GRIN lens) whose refractive index varies in a direction perpendicular to an optical axis and a diffraction type optical element (diffraction type lens), and is characterized in that it satisfies the following condition (1):

$$0.1 < \theta_{e1gF} < 0.5 \tag{1}$$

The achromatic lens system according to the present invention is characterized in that it satisfies the following condition (2):

$$67 < V_{e1} < 370 \tag{2}$$

DETAILED DESCRIPTION OF THE PREFERRED EMBODIMENTS

Figure 1:
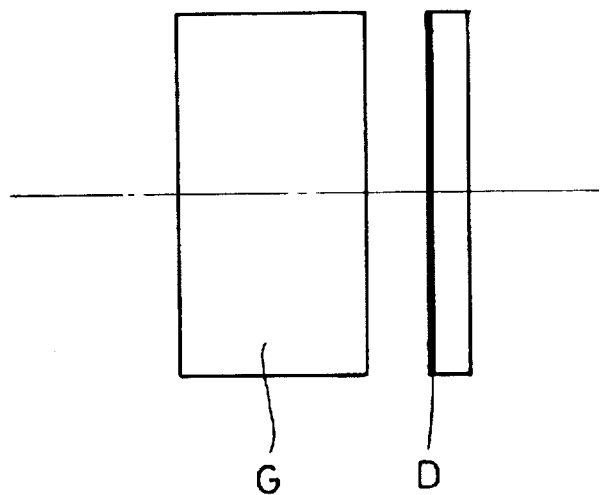
FIG. 1 shows a sectional view illustrating a fundamental composition of the achromatic lens system according to the present invention.

The achromatic lens system according to the present invention comprises, as shown in FIG. 1, a radial type gradient index lens (radial type GRIN lens) G whose refractive index varies in a direction perpendicular to an optical axis and a diffraction type optical element (diffraction type lens) D, and satisfies the following condition (1):

$$0.1 < \theta_{e1gF} < 0.5 \tag{1}$$

wherein the reference symbol $\theta_{e1gF}$ represents an equivalent partial dispersion ratio of the radial type GRIN lens.

The radial type GRIN lens is made of a medium which has a refractive index distribution in the direction perpendicular to the optical axis and a refractive index distribution N(r) is expressed by the following formula (a):

$$N(r) = N_0 + N_1 r^2 + N_2 r^4 + N_3 r^6 + \ldots \tag{a}$$

Wherein the reference symbol $N_0$ represents a refractive index on the optical axis, the reference symbol $N_i$ ($i=1, 2, 3, \ldots$) designates a coefficient expressing a refractive index distribution and the reference symbol r denotes a distance as measured from the optical axis in the direction perpendicular to the optical axis.

Further, an Abbe's number of a radial type GRIN lens is given by the formulae (b) and (c) which are shown below:

$$V_0 = (N_{0d} - 1)/(N_{0F} - N_{0C}) \tag{b}$$

$$V_i = N_{id}/(N_{iF} - N_{iC}) \; (i=1, 2, 3, \ldots) \tag{c}$$

Wherein $N_{i\lambda}$ ($i=1, 2, 3, \ldots$) represents a coefficient expressing a refractive index distribution at a wavelength $\lambda$, and the reference symbols $N_{id}$, $N_{iF}$ and $N_{iC}$ designate refractive index distributions at the wavelengths of the d-line, F-line and C-line respectively.

Further, partial dispersion ratios $\theta_{1dC}$ and $\theta_{1gF}$ of a medium of a radial type GRIN lens are given by the following formulae (d) and (e):

$$\theta_{1dC}=(N_{1d}-N_{1C})/(N_{1F}-N_{1C}) \tag{d}$$

$$\theta_{1gF}=(N_{1g}-N_{1F})/(N_{1F}-N_{1C}) \tag{e}$$

wherein the reference symbol $N_{1g}$ represents a coefficient $N_1$ which expresses a refractive index distribution at the wavelength of the g-line.

Furthermore, a diffraction type lens which has a concentric pattern and exhibits a function of a lens owing to the diffraction phenomenon of light has a color dispersion characteristic such as an Abbe's number of −3.45 which is extraordinary as compared with that of glass.

The achromatic lens system according to the present invention is configured to elaborately correct the residual secondary spectrum of chromatic aberration by combining the radial type GRIN lens and the diffraction type lens as described above.

FIG. 1 shows a fundamental composition of the achromatic lens system according to the present invention, wherein the lens system is composed by combining a radial type GRIN lens G having two planar surfaces with a diffraction type lens D. Let us represent a power of a medium of the radial type GRIN lens by $\phi_m$ and designate a power of the diffraction type lens by $\phi_D$, and assume that the two lenses are disposed close to each other as shown in the drawing. Then, chromatic aberration PAC of the C-line and F-line produced by this lens system is approximately given by the following formula (f):

$$PAC=K\{(\phi_m/V_1)+(\phi_D/V_D)\} \tag{f}$$

wherein the reference symbol $V_1$ represents an Abbe's number of medium of the radial type GRIN lens, the reference symbol $V_D$ designates an Abbe's number of the diffraction type lens and the reference symbol K denotes a constant.

Further, chromatic aberration of the g-line for the F-line is given by the following formula (g):

$$PAC(g)=K\{(\phi_m/V_1)\cdot\theta_{1gF}+(\phi_D/V_D)\cdot\theta_D\} \tag{g}$$

Wherein the reference symbol $\theta_{1gF}$ represents a partial dispersion ratio of the medium of the radial type GRIN lens and the reference symbol $\theta_D$ designates a partial dispersion ratio of the diffraction type lens for the g-line and the F-line.

Let us consider to make the lens system achromatic for three colors of the C-line, F-line and g-line. Since it is necessary for this purpose to zero both the formulae (f) and (g) at same time, $\theta_{1gF}$ and $\theta_D$ must have the same value.

Since $\theta_D$ is 0.2956 as described in the literature mentioned above, $\theta_{1gF}$ must have the value specified below as a condition required for making the lens system achromatic for the three colors.

$$\theta_{1gF}=0.2956 \tag{h}$$

On the basis of the condition derived here, and in view of facts that the lens system is actually thick and that different wavelengths must be balanced within the visible region other than the three colors, the achromatic lens system according to the present invention is configured so as to satisfy the condition (3) show below for favorably correcting the secondary spectrum:

$$0.1<\theta_{1gF}<0.5 \tag{3}$$

If the upper limit or the lower limit of the condition (3) is exceeded, it will be impossible to favorably correct the secondary spectrum.

For reducing chromatic aberration strictly at the three wavelengths in the achromatic lens system according to the present invention, it is desirable to satisfy, in place of the condition (3), the following condition (3-1):

$$0.2<\theta_{1gF}<0.4 \tag{3-1}$$

Now, let us consider a partial dispersion ratio $\theta_{1gF}$ of the radial type GRIN lens. According to Herzberger's dispersion formula (see "Optics for Optical Appliances 1-Basis and Design of Optical systems-" pp on and after 395 published by a foundational juridical person Japan Optoelectro Mechanics Association) a refractive index of an optical glass material is expressed by the following formula (i):

$$N(\lambda)=1+(n_d-1)\{1+B(\lambda)+A(\lambda)\tau_d\} \tag{i}$$

wherein the reference symbols $A(\lambda)$ and $B(\lambda)$ represent coefficients which are dependent only on a wavelength $\lambda$, and the reference symbol $\tau_d$ designates a dispersion ratio which is a reverse number of an Abbe's number.

From the formula (i) mentioned above, we can derive the following formula (j):

$$\delta n(\lambda)=\{1+B(\lambda)+A(\lambda)\tau_d\}\delta n_d+A(\lambda)(n_d-1)\delta\tau_d \tag{j}$$

Assuming that a characteristic of the glass material satisfies Herzberger's formula within each minute region of a radial type GRIN lens and, that coefficients of $N_2$ and higher orders out of the coefficients representing a refractive index distribution are small, a refractive index distribution coefficient in the vicinity of an optical axis is:

$$N_{1\lambda}=\delta n_{80}/\delta r^2$$

Hence, an Abbe's number of the medium is given by the following formula (l):

$$V_1=N_{1d}/(n_{1F}-N_{1C})=\delta n_d/(\delta n_F-\delta n_C)$$

$$=\delta n_d/[\tau_d\delta n_d+(n_d-1)\delta\tau_d] \tag{l}$$

From these formulae (e) and (i), $\theta_{1gF}$ is calculated as follows:

$$\theta_{1gF}=(N_{1g}-N_{1F})/(N_{1F}-N_{1C})$$

$$=(\delta n_g-\delta n_F)/(\delta n_F-\delta n_C)$$

$$=\{B(g)-B(F)\}V_1+\{A(g)-A(F)\}$$

$$=-0.001781\,V_1+0.6494$$

It will be understood from this formula that the partial dispersion ratio of the medium of the radial type GRIN lens is similar, within the assumed angle, to that of the ordinary glass material which has no extraordinary dispersion characteristic.

On the basis of the foregoing description and the condition (3), it is desirable that a medium of a radial type GRIN lens which has a low extraordinary dispersion characteristic satisfies the following condition (4):

$$67<V_1<370 \tag{4}$$

If the upper limit or the lower limit of the condition (4) is exceeded, chromatic aberration will be aggravated at the selected three wavelengths, thereby making it difficult to correct the residual secondary spectrum favorably over the entire visible region or it is necessary to use a material having an extraordinary dispersion characteristic which is largely different from that of the ordinary material for the radial type GRIN lens, thereby making it difficult to manufacture a material for the radial type GRIN lens.

When a radial type GRIN lens which has an extremely low extraordinary dispersion characteristic is to be used in the achromatic lens system according to the present invention or when the achromatic lens system is to be configured so as to strictly correct the secondary spectrum, it is desirable to satisfy, in place of the condition (4), the following condition (4-1):

$$84 < V_1 < 310 \tag{4-1}$$

If the upper limit or the lower limit of the condition (4-1) is exceeded, the secondary spectrum will remain in a large amount or it will be obliged to use a material having an extraordinary dispersion characteristic which is different from that of the ordinary material for the GRIN lens, thereby bringing about an undesirable result from a viewpoint of manufacturing of a material.

When chromatic aberration is corrected by satisfying the conditions (3), (3-1), (4) and (4-1), $\phi_m$ and $\phi_D$ have the same sign.

Figure 2:
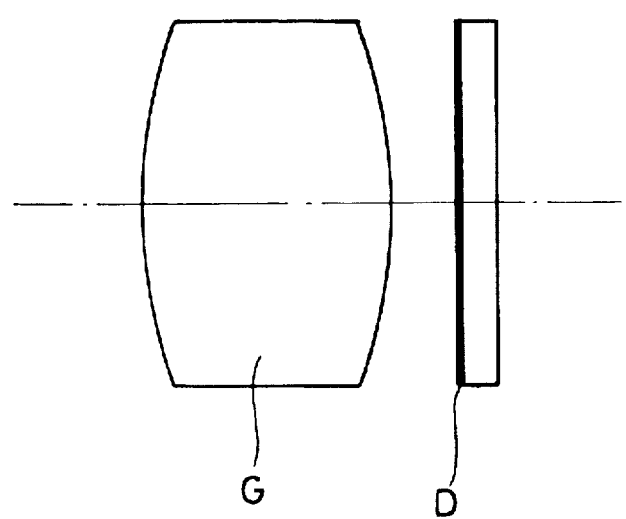
FIG. 2 shows a sectional view illustrating another fundamental composition of the achromatic lens system according to the present invention.

FIG. 2 shows a sectional view illustrating another composition of the achromatic lens system according to the present invention, wherein the achromatic lens system consists of a combination of a radial type GRIN lens which have curvature on the surfaces thereof and a diffraction type lens. In case of this achromatic lens system, it is necessary to take into consideration a refractive power $\phi_s$ which is produced by the surfaces of the radial type GRIN lens.

When the radial type GRIN lens has curvature on the surfaces thereof, formulae (m) and (n) which are mentioned below are used in place of the formulae (f) and (g):

$$PAC(s) = K[(\phi_s/V_0) + (\phi_m/V_1) + (\phi_D/V_D)] \tag{m}$$

$$PAC(sg) = K[(\phi_s/V_0)\theta_{0gF} + (\phi_m/V_1)\theta_{1gF} + (\phi_D/V_D)\theta_D] \tag{n}$$

wherein the reference symbols $V_0$ and $\theta_{0gF}$ represent an Abbe's number and a partial dispersion ratio respectively on the optical axis of the radial type GRIN lens. In addition, $\theta_{0gF}$ is expressed by the following formula:

$$\theta_{0gF} = (N_{0g} - N_{0F})/(N_{0F} - N_{0C})$$

wherein the reference symbol $N_{0g}$ represents a coefficient $N_0$ which expresses a refractive index distribution at the wavelength of the g-line.

The conditions (3), (3-1), (4) and (4-1) can be extended to manage the case where the radial type GRIN lens has the curvature, though the management is rather complicated, by using an equivalent partial dispersion ratio $\theta_{e1gF}$ which is determined by the formulae (o), (p) and (q) shown below, and an equivalent Abbe's number $V_{e1}$ in place of $\theta_{1gF}$ and $V_1$ respectively:

$$\phi = \phi_s + \phi_m \tag{o}$$

$$\phi/V_{e1} = (\phi_s/V_0) + (\phi_m/V_1) \tag{p}$$

$$(\phi/V_1)\theta_{e1gF} = (\phi_s/V_0)\theta_{0gF} + (\phi_m/V_1)\theta_{1gF} \tag{q}$$

wherein the reference symbol $\phi$ represents a refractive power of the radial type GRIN lens as a whole.

Accordingly, it is desirable that the achromatic lens system according to the present invention which is composed of the combination of the radial type GRIN lens having the curvature on the surfaces thereof and the diffraction type lens satisfies the following conditions (1) and (2):

$$0.1 < \theta_{e1gF} < 0.5 \tag{1}$$

$$67 < V_{e1} < 370 \tag{2}$$

Further, it is more preferable to satisfy, in place of the conditions (1) and (2), the conditions (1-1) and (2-1) shown below, thereby making it possible to obtain an achromatic lens system in which the secondary spectrum, for example, is corrected strictly:

$$0.2 < \theta_{e1gF} < 0.4 \tag{1-1}$$

$$84 < V_{e1} < 310 \tag{2-1}$$

A radial type GRIN lens which has the two planar surfaces has a power of surface $\phi_s$ of 0. In case of $\phi_s = 0$, these formulae are transformed as follows:

$$\theta_{e1gF} = \theta_{1gF}$$

$$V_{e1} = V_1$$

That is to say, the conditions (3) and (4) mentioned above can be obtained by using $V_1$ and $\theta_{1gF}$ in place of $V_{e1}$ and $\theta_{e1gF}$ respectively in the conditions (1) and (2). Accordingly, it is desirable to satisfy the conditions (1) and (2) whether a GRIN lens has curved surfaces or planar surfaces.

The achromatic lens system according to the present invention which has been described above is usable for composing optical systems not only for telescopes and microscopes but also image pickup system composed by combining the achromatic lens system with image pickup devices.

Now, description will be made of embodiments of the achromatic lens system according to the present invention.

Figure 3:
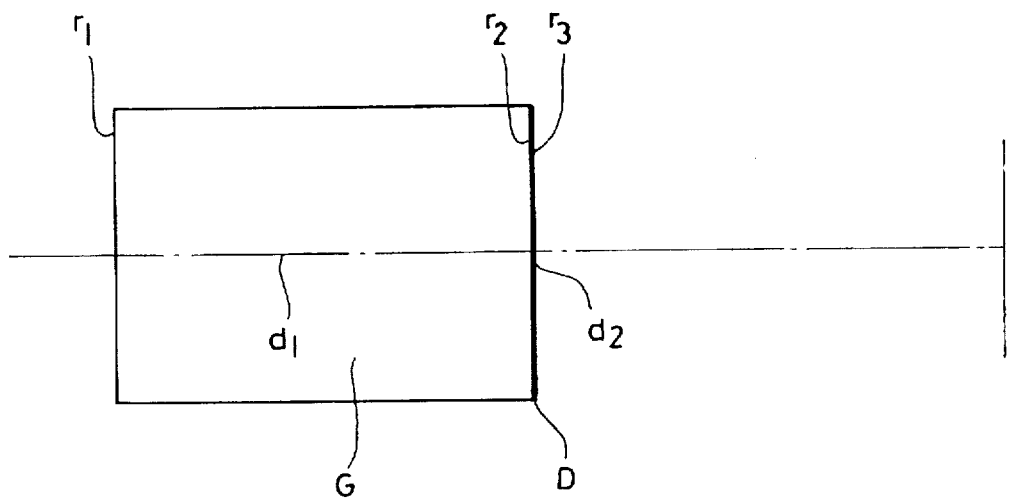
FIGS. 3 through 5 show sectional views illustrating compositions of first through third embodiments of the achromatic lens system according to the present invention.

A first embodiment has a composition illustrated in FIG. 3, wherein a diffraction lens is formed on an image side surface of a radial type GRIN lens which has two planar surfaces. The first embodiment has specifications and numerical data which are listed below:

| f = 10, F/4.0, maximum image height 1.85 | | |
|---|---|---|
| $r_1 = \infty$ (stop) | | |
| $d_1 = 6.9489$ | $n_1$ (gradient index lens) | |
| $r_2 = \infty$ | | |
| $d_2 = 0$ | $n_2 = 1001$ | $v_2 = -3.45$ (diffraction type lens) |
| $r_3 = -2.496 \times 10^5$ | | |
| Gradient index lens | | |
| $N_0 = 1.6640,$ | $N_1 = 7.5000 \times 10^{-3},$ | $V_0 = 38.2,$ $V_1 = 104$ |
| $\theta_{1dC} = 0.30$ | | |
| $\theta_{1gF} = 0.34,$ | $\theta_{e1gF} = 0.34,$ | $V_{e1} = 104$ |

Figure 4:
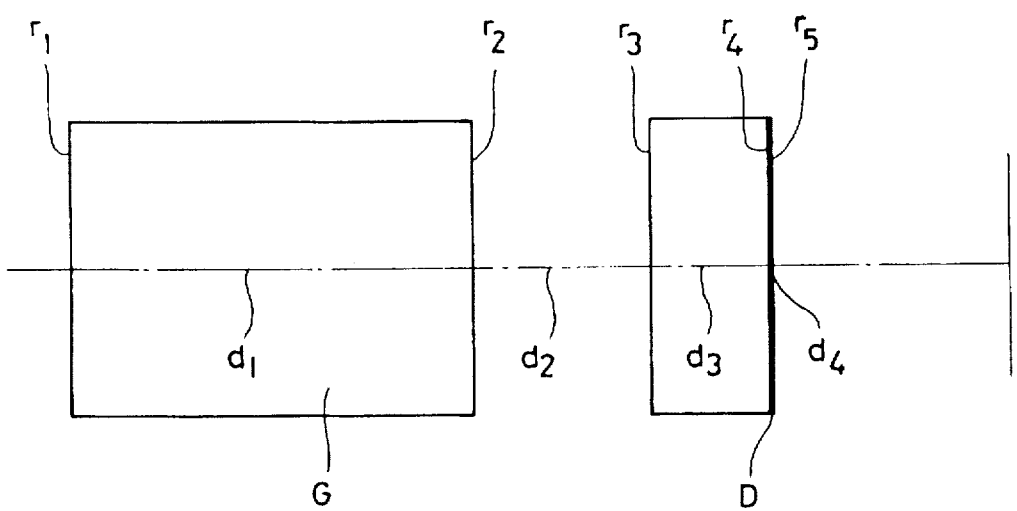

A second embodiment is composed, in order from the object side as shown in FIG. 4, of a radial type GRIN lens which has two planar surfaces and a diffraction type lens which is formed on a planar glass plate. The second embodiment has specifications and numeral data which are shown below:

| f = 10, F/4.0, maximum image height 1.85 |
| --- |

Figure 5:
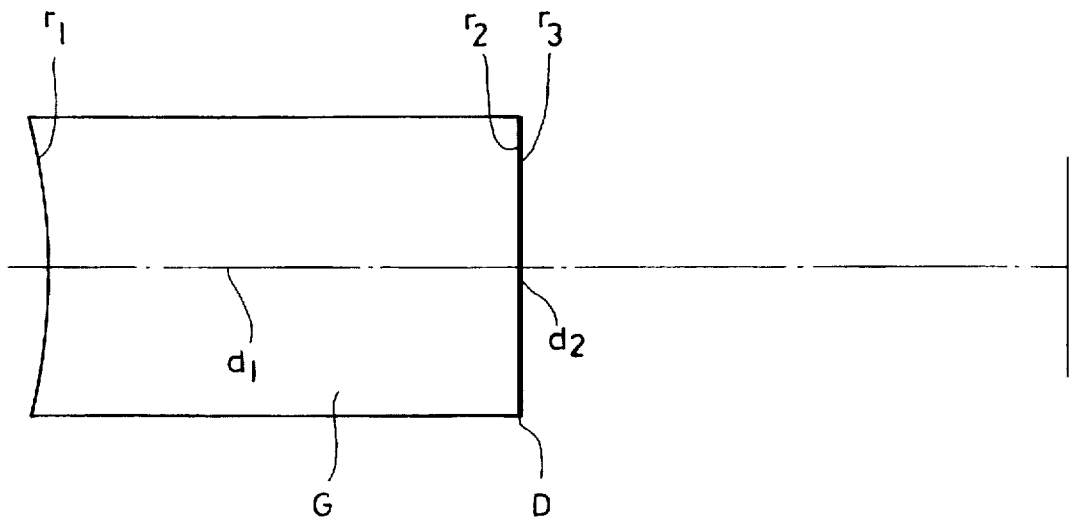

$r_1 = \infty$ (stop)
  $d_1 = 6.7176$    $n_1$ (gradient index lens)
$r_2 = \infty$
  $d_2 = 3.0000$
$r_3 = \infty$
  $d_3 = 2.0000$    $n_2 = 1.51633$  $v_2 = 64.15$
$r_4 = \infty$
  $d_4 = 0.0000$    $n_3 = 1001$  $v_2 = -3.45$ (diffraction type lens)
$r_5 = -6.696 \times 10^4$
gradient index lens $N_0 = 1.6640$,   $N_1 = -7.5000 \times 10^{-3}$,   $V_0 = 38.2$,   $V_1 = 101$
$\theta_{1dC} = 0.30$
$\theta_{1gF} = 0.35$,   $\theta_{e1gF} = 0.35$,   $V_{e1} = 101$ A third embodiment has a composition illustrated in FIG. 5, wherein an achromatic lens system is composed of a radial type GRIN lens which has a concave object side surface and a planar image side surface, and a diffraction type lens which is formed on an image side surface of the radial type GRIN lens. This achromatic lens system has specifications and numerical data which are listed below:

| f = 10, F/4.0, maximum image height 1.85 |
| --- |

$r_1 = -10.000$ (stop)
  $d_1 = 7.7588$    $n_1$ (gradient index lens)
$r_2 = \infty$
  $d_2 = 0$       $n_2 = 1001$  $v_2 = -3.45$ (diffraction type lens)
$r_3 = -3.804 \times 10^5$
gradient index lens $N_0 = 1.60000$,   $N_1 = -1.0000 \times 10^{-2}$,   $V_0 = 45.00$,   $V_1 = 78$
$\theta_{1dC} = 0.30$
$\theta_{1gF} = 0.34$,   $\theta_{e1gF} = 0.21$,   $V_{e1} = 184$ In the numerical data of the three embodiments, that of the diffraction type lens is specified in a form wherein a refractive index at a standard wavelength of the d-line is taken as 1001 using the so called ultra high refractive index approximation.

Figure 6:
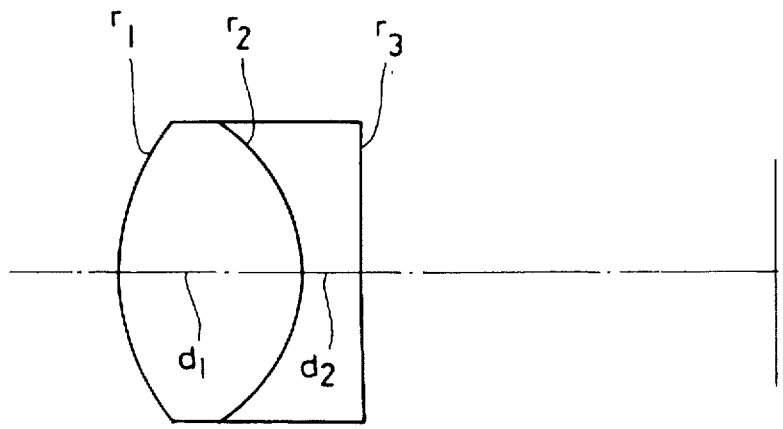
FIG. 6 shows a sectional view illustrating a composition of a conventional achromatic lens system.

FIG. 6 shows an achromatic lens system which has the same specifications as those for the achromatic lens system according to the present invention, but is composed of the ordinary cemented lens and has the following numerical data:

| f = 10, F/4.0, maximum image height 1.85 |
| --- |

$r_1 = 4.0230$ (stop)
  $d_1 = 3.0000$    $n_1 = 1.51633$    $v_1 = 64.14$
$r_2 = -2.9157$
  $d_2 = 1.0000$    $n_2 = 1.62004$    $v_2 = 36.26$
$r_3 = 234.6664$ The first, second and third embodiments of the present invention, and the achromatic lens system shown in FIG. 6 have longitudinal chromatic aberration listed below:

| | Wavelength | | | | | |
| --- | --- | --- | --- | --- | --- | --- |
| | 365.01 nm i-line | 435.83 nm g-line | 486.13 nm F-line | 546.07 nm e-line | 587.56 nm d-line | 656.27 nm C-line |
| Embodiment 1 | −0.0142 | −0.0075 | −0.0075 | −0.0002 | 0 | −0.0075 |
| Embodiment 2 | −0.0124 | −0.0072 | −0.0072 | −0.0002 | 0 | −0.0072 |
| Embodiment 3 | −0.0175 | −0.0065 | −0.0065 | −0.0001 | 0 | −0.0065 |
| Lens system Shown in FIG. 6 | 0.0977 | 0.0203 | 0.0046 | −0.0005 | 0 | 0.0046 |

I claim:

1. An achromatic lens system comprising: a radial type gradient index lens which has a refractive index varying in a direction perpendicular to an optical axis; and a diffraction type lens, wherein said achromatic lens system satisfies the following condition (1):

$$0.1 < \theta_{e1gF} < 0.5 \tag{1}$$

wherein the reference symbol $\theta_{e1gF}$ represents an equivalent partial dispersion ratio of said radial type gradient index lens.

2. An achromatic lens system according to claim 1 satisfying the following condition (2):

$$67 < V_{e1} < 370 \tag{2}$$

wherein the reference symbol $V_{e1}$ represents an equivalent Abbe's number of said radial type gradient index lens.

3. An achromatic lens system according to claim 1 satisfying, in place of the condition (1), the following condition (1-1)

$$0.2 < \theta_{e1gF} < 0.4 \tag{1-1}$$

4. An achromatic lens system according to claim 2 satisfying, in place of the condition (2), the following condition (2-1)

$$84 < V_{e1} < 310 \tag{2-1}$$

5. An achromatic lens system according to claim 1, 2, 3 or 4 wherein said radial type gradient index lens has two planar surfaces.

6. An achromatic lens system according to claim 1, 2, 3 or 4 wherein said radial type gradient index lens has at least one curved surface.

7. An achromatic lens system according to claim 1, 2, 3 or 4 wherein said radial type gradient index lens has a concave surface on the object side.

8. An achromatic lens system according to claim 1, 2, 3 or 4 wherein said diffraction type lens is formed on a surface of said radial type gradient index lens.

* * * * *